United States Patent [19]

Goodwin

[11] Patent Number: 5,795,213
[45] Date of Patent: Aug. 18, 1998

[54] READING TOY

[75] Inventor: Richard P. Goodwin, Bristol, Tenn.

[73] Assignee: General Creation International Limited, Bristol, Tenn.

[21] Appl. No.: 837,753

[22] Filed: Apr. 22, 1997

[51] Int. Cl.$^6$ .............................. A63H 3/28; A63H 5/00; G09B 5/00
[52] U.S. Cl. ..................... 446/297; 446/81; 446/302; 434/317
[58] Field of Search .......................... 446/297, 397, 446/302, 298, 299, 72, 81; 434/169, 308, 178, 317

[56] References Cited

U.S. PATENT DOCUMENTS

| 4,516,950 | 5/1985 | Berman et al. | 446/297 |
| 4,820,233 | 4/1989 | Weiner | 446/397 |
| 5,263,865 | 11/1993 | Zipf | 434/317 X |
| 5,413,486 | 5/1995 | Burrows et al. | 434/317 |

*Primary Examiner*—Robert A. Hafer
*Assistant Examiner*—D. Neal Muir
*Attorney, Agent, or Firm*—G. Brian Pingel

[57] ABSTRACT

A portable toy having an audio signal producer is provided with a book. The book has a plurality of numbered pages containing parts of a story. The toy is provided with a plurality of pressure switches designating different pages of the book. When a particular pressure switch is depressed, the text of the corresponding page is read aloud through a speaker provided in the toy.

12 Claims, 5 Drawing Sheets

READING TOY

BACKGROUND OF THE INVENTION

1. Field of the Invention

The present invention relates in general to a child's toy provided with an electronically actuated voice, and, more particularly, to child's toy which is provided with a book and which provides an audio interpretation of each page of the book upon actuation of a portion of the toy identifying the number of the desired page.

2. Description Of The Prior Art

It is known in the art to provide portable toys with a tape or similar medium to play audio signals which represent the text of a story. In such toys, a tape is placed within a plush animal and a child is given a book associated with the audio tape. When the tape is played through the plush animal, the child may read along with the associated book.

A major drawback associated with such prior art devices is the inability to manipulate the toy to provide audio signals representative of particular pages of the book. Without such an interactive feature, a child may become quickly disinterested and would not become an active participant in the telling of the story. Additionally, if a portion of the story is misunderstood or otherwise unclear, it is difficult to repeat the portion of the story which was not fully understood. Accordingly, it would be desirable to provide a reading toy which could be easily manipulated to provide audio signals representative of text on desired pages of an associated book. The difficulties encountered in the prior art discussed hereinabove are substantially eliminated by the present invention.

SUMMARY OF THE INVENTION

The present invention provides a learning device for audibly relating written material to a listener. The device includes a book having written material. The written material is provided on a first page identified with a first symbol and a second page identified with a second symbol. The device also includes a portable toy having an electrical power source, a first actuator and a second actuator. The first and second actuators are identified by the first and second symbols respectively. Signal producing means are also provided and coupled to the first and second actuators. The signal producing means is for production of a first audio signal upon actuation of the first actuator and for production of a second audio signal upon actuation of the second actuator. The first audio signal is an audio interpretation of the first written material and the second audio signal is an audio interpretation of the second written material.

In the preferred embodiment, the written material is a story divided among pages of the book which are consecutively numbered. Preferably the toy is provided with a head, body and legs and the actuators are provided on the feet of the toy. The actuators are designated with corresponding page numbers, so that when a child actuates a specifically numbered actuator, the toy begins "reading" the corresponding page from the book.

The toy may be provided with a remote control means so that the child may actuate the toy from a distance. The toy may also be provided with a plurality of books, and a switching means, so that actuators cause the toy to read different stories depending on the particular book being read.

DETAILED DESCRIPTION OF THE PREFERRED EMBODIMENT

Figure 1:
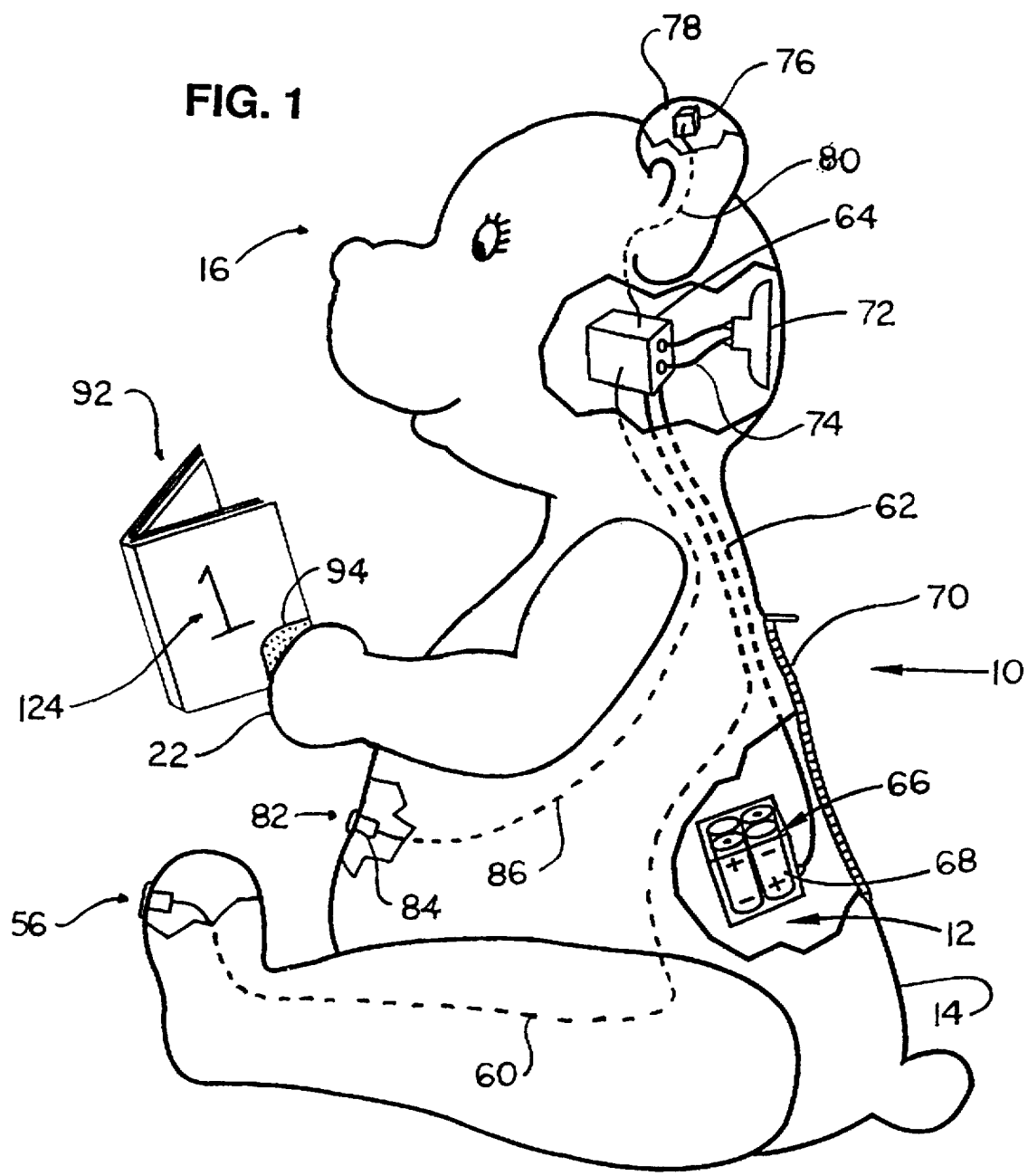
FIG. 1 is a side elevation in partial cut-away and partial phantom showing the portable toy and a first book of the present invention.
Figure 2:
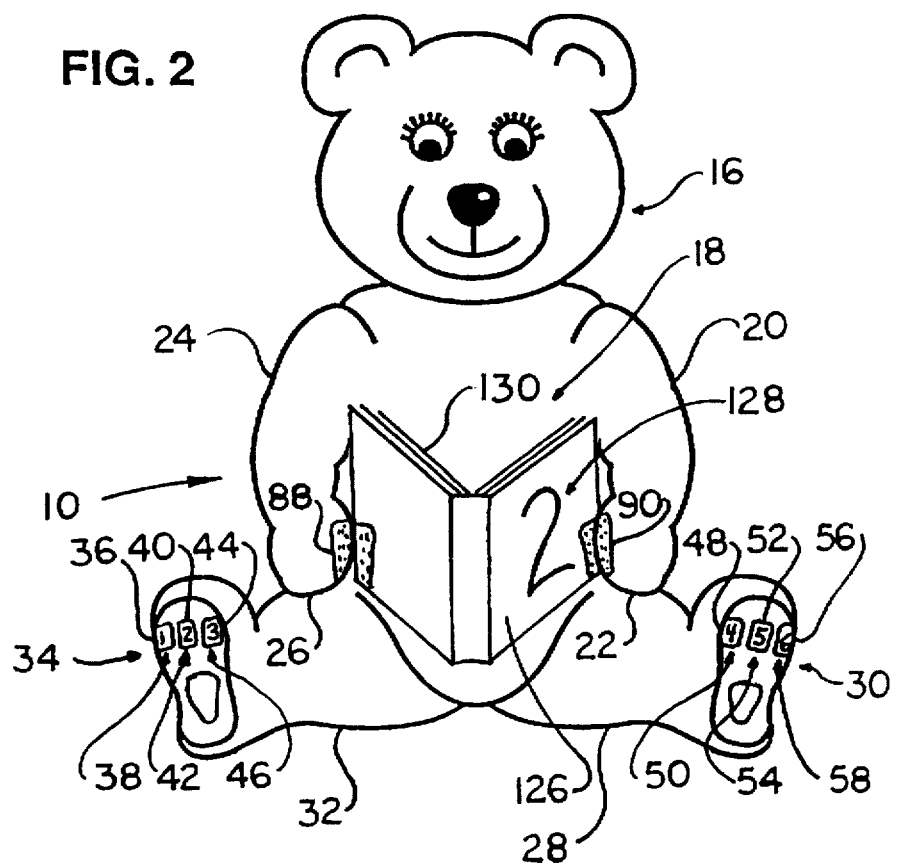
FIG. 2 is a front elevation in partial phantom showing the portable toy of FIG. 1 with a second book.

With reference to the drawings, a child's toy, commonly referred to as a "teddy bear", is indicated generally at 10 in FIG. 1. The toy 10 is preferably provided with an interior 12 and an exterior shell 14. While the shell 14 may be of any suitable material, it is preferably constructed of cotton, polyester or some other plush material. As shown in FIG. 2, the toy 10, is preferably provided with a head 16, a body 18, a left arm 20, a left hand 22, a right arm 24, a right hand 26, a left leg 28, a left foot 30, a right leg 32 and a right foot 34.

As shown in FIG. 2, the right foot 34 is provided with a first pressure switch 36 designated with a first number 38 which in the figure case is the number "1." The right foot 34 is provided with a second pressure switch 40 having a second number 42 "2," a third pressure switch 44 and a third number 46 "3."

Similarly, the left foot 30 is provided with a fourth pressure switch 48 having a fourth number 50 "4," a fifth pressure switch 52 having a fifth number 54 "5" and a sixth pressure switch 56 having a sixth number 58 "6." As shown in FIGS. 1 and 2, the pressure switches 36, 40, 44, 48, 52 and 56 are connected by wires 60 to a control unit 64. The control unit 64 is preferably an integrated circuit (IC) chip which is designed to function as described below.

Figure 3:
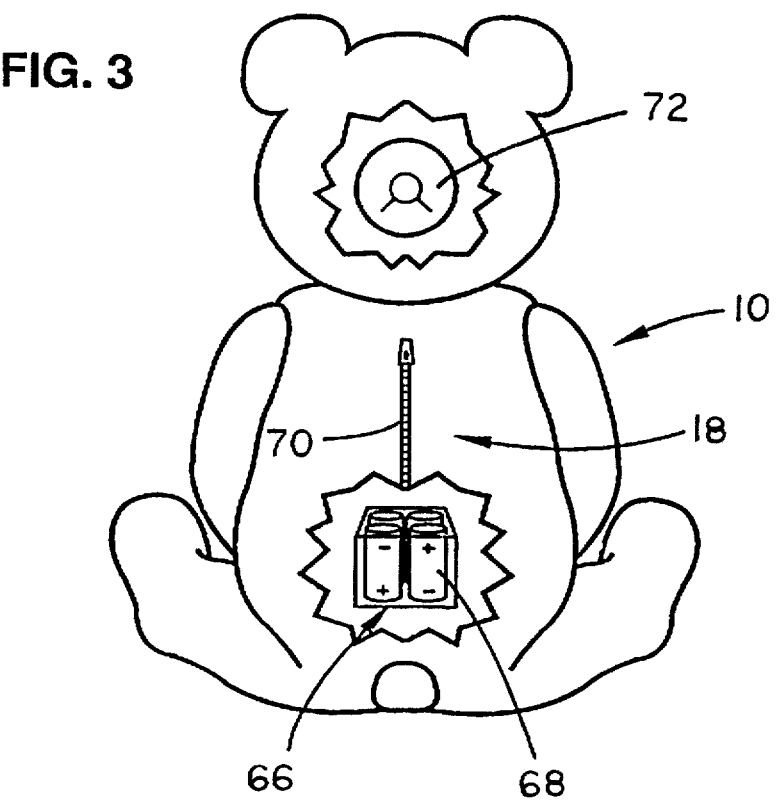
FIG. 3 is a rear elevation in partial cut-away showing the portable toy of FIG. 2.

As shown in FIGS. 1 and 3, the control unit 64 is coupled to a battery pack power source 66. The battery pack 66 preferably holds four D-cell batteries 68, but may, of course, hold any suitable power source. The toy 10 is preferably provided with a zipper 70 or similar access means to allow the battery pack 66 to be serviced and/or replaced. The battery pack 66 is connected by wires 62 to the control unit 64.

The control unit 64 is programmed, as is known in the art, to produce a signal which travels to a speaker 72 through wires 74 to create sound. The speaker 72 is shown in contact with the shell 14 of the toy 10 to provide maximum signal strength. It should be noted, however, that the speaker 72 may be placed in any desirable area of the toy 10.

A control pressure switch 76 is located in an ear 78 of the toy 10 and connected by a wire 80 to the control unit 64. Also as shown in FIG. 1, the toy 10 is preferably provided with a "belly-button" 82. Provided within the belly-button 82 is an infrared light reader 84. The infrared light reader 84 is connected by a wire 86 to the control unit 64.

As shown in FIG. 2, the right hand 26 is provided with a first piece of hook and latch material 88 and the left hand 22 is provided with a second piece of hook and latch material 90. As shown in FIG. 1, a book 92 is provided with hook and latch material 94 which allows the book 92 to be releasably secured to the hands 22 and 26 of the toy 10.

Figure 4:
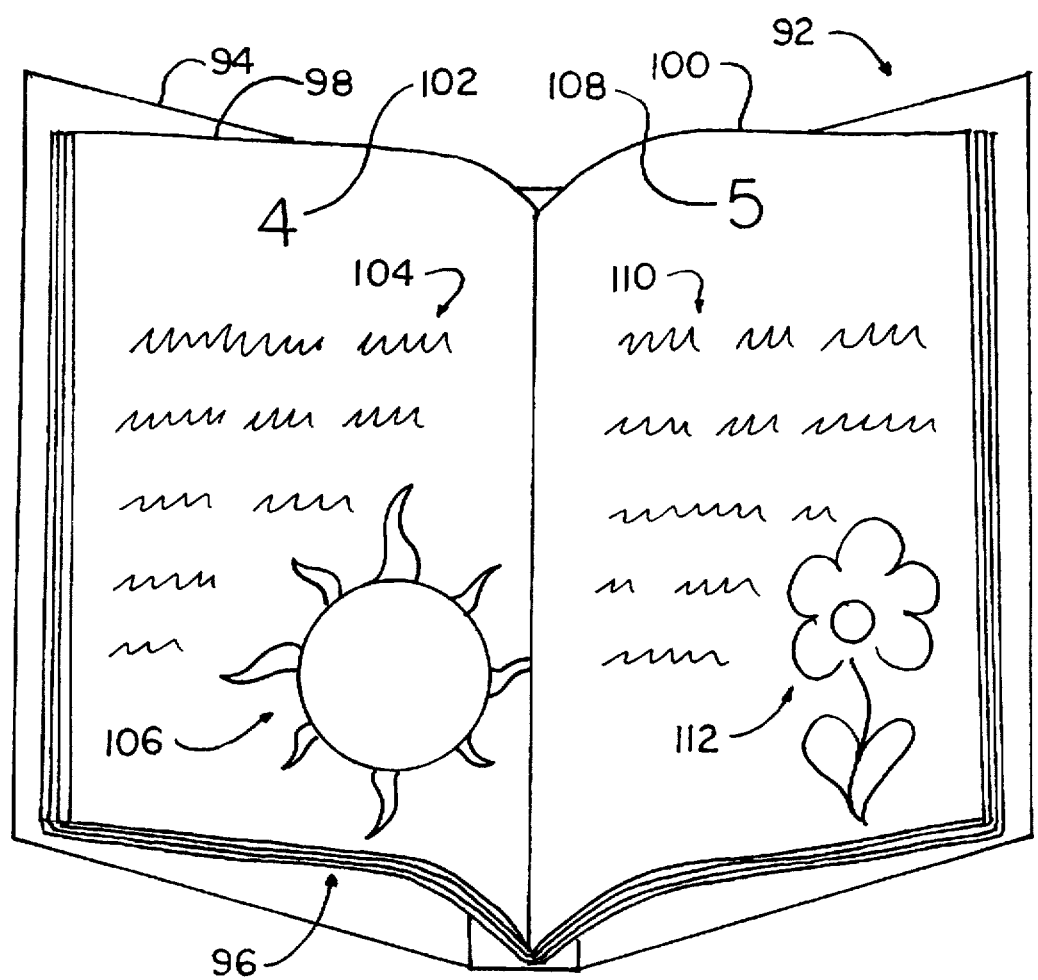
FIG. 4 is a perspective view of the book of FIG. 1.

The book 92 is shown in detail in FIG. 4. The book is provided with a cover 94 and a plurality of pages 96. Shown in FIG. 4 is a fourth page 98 and a fifth page 100. The fourth page 98 is provided with a page number 102, text 104, and a picture 106. Similarly, the fifth page 100 is provided with a page number 108, text 110 and a picture 112.

Figure 5:
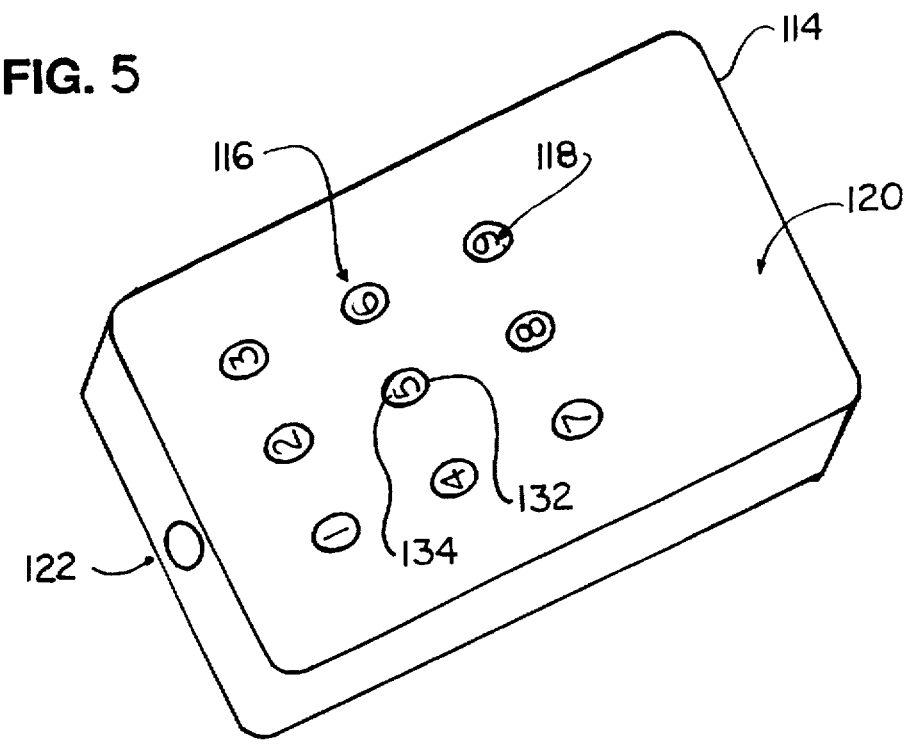
FIG. 5 is a perspective view of a remote control device which may be used to actuate the portable toy of FIG. 1.

Shown in FIG. 5 is a remote control unit 114 such as those well known in the art. The remote control unit 114 is provided with a plurality of pressure switches 116 each identified with a respective number 118. The pressure switches 116 are connected to power source 120 which, in turn, is coupled to an infrared transmitter 122 such as those well known in the art. The remote control unit 114 is designed to send wireless signal, such as a uniquely identifiable infrared light signal, corresponding to a particular pressure switch 116 being depressed.

To operate the toy of the present device, the book 92 is secured to the toy 10 by the hook and latch material 88, 90 and 94 (FIGS. 1–2). Preferably the book 92 is provided with a unique numeric code 124 which, as shown in FIG. 1, is the number "1." To trigger the control unit 64 to provide audio signals which correspond to the particular book 92 being used, the control pressure switch 76 in the ear 78 is depressed the number of times indicated by the unique numeric code 124. The control unit 64 is programmed with a plurality of "audio response sets". Each audio response set is a collection of audio signals which correspond to the pages of a particular book. The control pressure switch 76 is used to program the control unit 64 to play the audio signals of the particular audio response set which corresponds with the particular book being read. In the case identified in FIG. 1, the control pressure switch 76 would be depressed once to match with the unique numeric code 124 of the book 92. Once the book 92 is releasably secured to the toy 10 and the control pressure switch 76 depressed the number of times indicated by the unique numeric code 124, the book 92 may be opened as shown in FIG. 4 to a particular page. In this instance, the book 92 is shown open to the fourth page 98 and the fifth page 100. If it is desired to hear an audio translation of the text 104 of the fourth page 98, the page number 102 is located and the corresponding pressure switch 48, located on the left foot 30 of the toy 10, is depressed. This depression triggers the control unit 64 to send an audio signal to the speaker 72 which provides an audio translation of the text 104 on the fourth page 98.

Similarly, if it is desired to hear an audible translation of the text 110 of the fifth page 100, the page number 108 is located and the corresponding pressure switch 52 of the left foot 30 is depressed, thereby triggering the control unit 64 to provide an audible translation of the text 110 on the fifth page 100.

Alternatively, the control unit 64 can be configured so that instead of providing an audible translation of text as described above, the control unit provides an audible translation of pictures or figures. In such an instance, the book 92 would be opened to a particular page such as that shown in FIG. 4. The page number 102 located on the same page as the picture 106 is identified and the corresponding pressure switch 48 is depressed, which causes the control unit 64 to send an audio signal to the speakers 72 giving an audible translation of the picture 106 such as "This is the Sun."

If it is desired to have the toy 10 "read" another book, a supplemental book 126, is provided as shown in FIG. 2, having its own unique numeric code 128. Once the supplemental book 126 has been secured to the hook and latch material 88 and 90 located on the toy 10, the control pressure switch 76 located in the ear 78 of the toy 10 is depressed the number of times indicated by the unique numeric code 128 of the supplemental book 126. In this case the control pressure switch 76 is depressed twice to program the control unit 64 to play the audio signals associated with the second audio response set. If the control pressure switch 76 is accidentally depressed an incorrect number of times, any of the pressure switches 36, 40, 44, 48, 52, or 56 may be depressed to reset the control unit 64 to receive signals from the control pressure switch 76. Once the control pressure switch 76 has been depressed the appropriate number of times, the control unit 64 is thereby programmed to "read" the corresponding pages 130 of the supplemental book 126 as described above.

If it is desired to have the toy 10 actuated from a distance, the remote control unit 114 is held with the infrared transmitter 122 directed toward the infrared light reader 84 located in the belly-button 82 of the toy 10 (FIGS. 1 and 5). If it is desired to have the text 110 of the fifth page 100 of the book 92 read, the particular pressure switch 132 of the remote control unit 114 designated with the number five 134 is depressed (FIGS. 4–5). Once the pressure switch 132 is depressed, the infrared transmitter 122 transmits a unique infrared signal to the infrared light reader 84 of the toy 10 to actuate the control unit 64 to produce an audio signal corresponding to the text 110 of the book 92 (FIGS. 1, 4 and 5).

Although the invention has been described with respect to a preferred embodiment thereof, it is to be understood that it is not to be so limited, since changes and modifications can be made therein which are within the full intended scope of this invention as defined by the appended claims. For example, it is anticipated that any number of books may be provided, and that an internal tape drive or compact disc drive may be provided to allow the toy to be updated with additional audio information. It is additionally anticipated that the infrared remote control may be secured to a particular book and that pressure switches be provided under the page numbers of the book so the page numbers can be directly depressed to trigger speech from the toy. It is also anticipated that the pressure switches may be provided on any location throughout the toy and may be provided with geometric or symbolic designations representing various pages of the books, rather than being limited to strictly numeric designations.

What is claimed is:

1. A learning device for audibly relating written material to a listener comprising:

(a) a book comprising:
      (i) a first page containing a first written material, said first written material being capable of audio interpretation;
      (ii) a second page containing a second written material, said second written material being capable of audio interpretation:

(b) a supplemental book comprising:
      (i) a third page containing a third written material, said third written material being capable of audio interpretation;
      (ii) a fourth page containing a fourth written material, said fourth written material being capable of audio interpretation;

(c) a portable toy having an interior, said portable toy comprising the following elements, at least several of which are within said interior:
      (i) an electric power source;
      (ii) a first actuator;
      (iii) a second actuator;
      (iv) a switch means having at least a first condition and a second condition; and
      (v) a memory storage means for storing electronic data corresponding to the written material on said pages of the book and the supplemental book, which storage means is electronically connected to said switch means and said first and second actuators and produces audio signals including:
  (1) a first audio signal upon actuation of said first actuator when said switch means is in said first condition;
  (2) a second audio signal upon actuation of said second actuator when said switch means is in said first condition;
  (3) a third audio signal upon actuation of said first actuator when said switch means is in said second condition; and
  (4) a fourth audio signal upon actuation of said second actuator when said switch means is in said second condition;
(d) wherein said first audio signal is an audio interpretation of said first written material;
(e) wherein said second audio signal is an audio interpretation of said second written material;
(f) wherein said third audio signal is an audio interpretation of said third written material; and
(g) wherein said fourth audio signal is an audio interpretation of said fourth written material.

2. The learning device of claim 1, wherein said first written material is a first set of words, and wherein said second written material is a second set of words.

3. The learning device of claim 2, wherein said first set of words and said second set of words comprise a story.

4. The learning device of claim 1, wherein said portable toy further comprises:
  (a) a body;
  (b) a head secured to said body; and
  (c) at least one eye secured to said head.

5. The learning device of claim 4, further comprising:
  (a) a leg secured to said body;
  (b) a foot secured to said leg; and
  (c) wherein said first actuator and said second actuator are located on said foot.

6. The learning device of claim 5, wherein said portable toy is a doll.

7. The learning device of claim 5, wherein said portable toy is a bear.

8. The learning device of claim 1, further comprising a remote control system comprising:
  (a) a remote actuator identified by said first symbol;
  (b) means coupled to said remote actuator for generating a wireless signal upon actuation of said remote actuator; and
  (c) means coupled to said signal producing means for receiving said wireless signal.

9. The learning device of claim 8, further comprising a supplemental remote actuator, identified by said second symbol, and coupled to said wireless signal generating means.

10. The learning device of claim 1, wherein said third written material is a third set of words and said fourth written material is a fourth set of words.

11. The learning device of claim 10, wherein said third set of words and said fourth set of words comprise a story.

12. The learning device of claim 1, wherein a first symbol is provided on said first page, a second symbol is provided on second page, and said first symbol and said second symbol are page numbers corresponding to said first actuator and said second actuator respectively.

* * * * *